(12) United States Patent
Higuchi

(10) Patent No.: US 9,420,811 B2
(45) Date of Patent: Aug. 23, 2016

(54) DRIED NOODLES MANUFACTURING METHOD

(75) Inventor: Masahiro Higuchi, Fujimino (JP)

(73) Assignee: NISSHIN FOODS INC., Tokyo (JP)

( * ) Notice: Subject to any disclaimer, the term of this patent is extended or adjusted under 35 U.S.C. 154(b) by 63 days.

(21) Appl. No.: 14/004,492

(22) PCT Filed: Mar. 15, 2012

(86) PCT No.: PCT/JP2012/056620
§ 371 (c)(1),
(2), (4) Date: Sep. 11, 2013

(87) PCT Pub. No.: WO2012/124749
PCT Pub. Date: Sep. 20, 2012

(65) Prior Publication Data
US 2014/0004238 A1     Jan. 2, 2014

(30) Foreign Application Priority Data

Mar. 15, 2011    (JP) .................................. 2011-056360

(51) Int. Cl.
*A23L 1/16*    (2006.01)

(52) U.S. Cl.
CPC *A23L 1/1613* (2013.01); *A23L 1/16* (2013.01)

(58) Field of Classification Search
CPC ................................. A23L 1/16; A23L 1/1613
USPC ........................................................ 426/451
See application file for complete search history.

(56) References Cited

U.S. PATENT DOCUMENTS

| | | | | |
|---|---|---|---|---|
| 4,483,879 | A * | 11/1984 | Sugisawa et al. ............... | 426/451 |
| 4,775,542 | A * | 10/1988 | Manser et al. .................. | 426/458 |
| 5,057,330 | A * | 10/1991 | Lee et al. ....................... | 426/120 |
| 5,517,905 | A * | 5/1996 | Manser et al. .................. | 99/470 |
| 6,022,575 | A * | 2/2000 | Lee et al. ....................... | 426/557 |
| 2002/0192339 | A1 * | 12/2002 | Hauser et al. .................. | 426/143 |
| 2004/0033296 | A1 * | 2/2004 | Yuan et al. ..................... | 426/326 |
| 2009/0011099 | A1 | 1/2009 | Kim et al. | |

FOREIGN PATENT DOCUMENTS

| | | |
|---|---|---|
| EP | 0 322 053 A1 | 6/1989 |
| EP | 0 322 053 B1 | 6/1989 |
| JP | 51 73150 | 6/1976 |
| JP | 7 250639 | 10/1995 |
| JP | 2001 149030 | 6/2001 |
| JP | 2002 34435 | 2/2002 |

OTHER PUBLICATIONS

Temmerman et al., Modelling of Transient Moisture Concentration of Semolina Pasta during Air Drying, Journal of Food Engineering, pub. Oct. 2, 2006.*
Definition of "room temperature." Merriam-Webster. Apr. 23, 2009 http://web.archive.org/web/20090423000241/http://www.merriam-webster.com/medical/room%°temperature.*
EPA, Pasta Manufacturing Final Report, Aug. 1995, pp. 2-1 to 2-5.*
Extended Search Report issued Sep. 19, 2014 in European Patent Application No. 12757301.2.
International Search Report Issued Jun. 19, 2012 in PCT/JP12/056620 Filed Mar. 15, 2012.

* cited by examiner

*Primary Examiner* — Viren Thakur
*Assistant Examiner* — Thanh H Nguyen
(74) *Attorney, Agent, or Firm* — Oblon, McClelland, Maier & Neustadt, L.L.P.

(57) ABSTRACT

Provided are dried noodles having no or very little cracking and a manufacturing method therefor. The method for manufacturing dried noodles comprises a drying step of drying noodle strands to reach the percentage of water content of 15% or less under an environment maintained at a temperature of 30 to 50° C. and humidity of 60 to 80%; a cooling step of cooling, after the drying step, the noodle strands for 15 to 60 minutes under an environment maintained at a temperature of 15 to 25° C. and humidity of 40 to 70%; a packaging step of packaging, after the cooling step, the noodle strands; and a heating step of heating, after the packaging step, the noodle strands for 15 minutes to 120 minutes under an environment maintained at a temperature of 30 to 40° C.

11 Claims, No Drawings

DRIED NOODLES MANUFACTURING METHOD

TECHNICAL FIELD

The present invention relates to a method for manufacturing dried noodles having no cracking.

BACKGROUND ART

Dried noodles which have cracking or deformation are not visually beautiful, and the commercial value is drastically impaired. Particularly in the case of noodle strands, cracking is likely to cause damage such as breakage and chipping of noodles. Therefore, prevention of cracking is important.

Cracking of dried noodles is primarily attributable to uneven drying in a drying step. Conventionally, as a method for drying noodles for manufacturing good quality dried noodles, for example, Patent Literature 1 describes a method for drying noodles, comprising, in the state in which dried noodle materials are vertically hung by a hanging tool horizontally disposed in a drying chamber, generating nearly horizontal airflow along the longitudinal direction of the hanging tool by introducing air into the drying chamber from outside the chamber, while discharging air out of the chamber, and drying the dried noodle materials by exposing the dried noodle materials to the airflow transversely.

However, the method of Patent Literature 1 requires strict control of wind speed to prevent rapid drying, and moreover, the actual situation is that fully satisfactory results have not been achieved in respect of prevention of cracking of dried noodles.

CITATION LIST

Patent Literature

[Patent Literature 1] JP-A-2002-34435

SUMMARY OF INVENTION

The present invention provides a method for manufacturing dried noodles, comprising a drying step of drying noodle strands to reach the percentage water content of 15% or less is reached under an environment maintained at a temperature of 30 to 50° C. and humidity of 60 to 80%; a cooling step of cooling, after the drying step, the noodle strands for 15 to 60 minutes under an environment maintained at a temperature of 15 to 25° C. and humidity of 40 to 70%; a packaging step of packaging, after the cooling step, the noodle strands; and a heating step of heating, after the packaging step, the noodle strands for 15 to 120 minutes under an environment maintained at a temperature of 30 to 40° C.

DESCRIPTION OF EMBODIMENTS

An object of the present invention is to provide a method for manufacturing dried noodles having no or very little cracking.

The present inventor conducted intensive research in order to achieve the aforementioned object. As a result, they found that dried noodles having no or very little cracking can be obtained by performing a drying step of drying noodle strands at a certain temperature and humidity, and successively performing a cooling step of cooling the noodle strands, and subsequently, packaging the noodle strands, and then performing a heating step of heating the resulting packaged noodle strands, thereby completing the present invention.

The present invention can provide dried noodles having no or very little cracking, which are free from the risk of damage such as breakage or chipping of noodles, and moreover, are visually beautiful.

In the method for manufacturing dried noodles of the present invention, the noodle strands may be noodle strands which are one of cut noodles prepared using an appropriate formulation of wheat flours such as soft wheat flour, moderate wheat flour, and hard wheat flour, buckwheat flour, durum flour, rice flour, and the like. No particular limitation is imposed on the kind of the aforementioned soft wheat flour, moderate wheat flour, hard wheat flour, buckwheat flour, durum flour, rice flour, and the like, and a publicly known kind of flour can be used.

No particular limitation is imposed on the kind of the noodle strands as long as they are noodle strands which are one of cut noodles, and examples thereof include udon (thick wheat flour noodles), soba (buckwheat noodles), hiyamugi (thin wheat flour noodles), kishimen (flat wheat flour noodles), reimen (cold noodles), Chinese noodles, pasta noodle strands and the like. In regard to a diameter before drying, noodle strands which are 1 mm to 5 mm thick are preferable, and noodle strands which are approximately 1 to 3 mm thick in diameter are more preferable. It is to be noted that in the present specification, the diameter of noodle strands or thickness of noodle strands refers to the maximum length in the width direction of the cross-sectional surface of the noodle strands.

The aforementioned noodle strands can be manufactured by a commonly performed manufacturing method of cut noodles. For example, the noodle strands can be manufactured by the following steps. To a powder obtained by appropriately blending soft wheat flour, moderate wheat flour, hard wheat flour, buckwheat flour, durum flour, rice flour, and the like, appropriate amounts of water and salt are added, and other materials are added as needed, followed by kneading to prepare dough. If necessary, the dough is aged. The dough is then rolled out flat to an appropriate thickness and cut into an arbitrary width, whereby noodle strands are prepared.

The noodle strands manufactured by the steps shown above are then subjected to the drying step according to the method of the present invention. Before being subjected to the drying step, the diameter of the noodle strands is 1 to 5 mm, preferably approximately 1 to 3 mm, and the percentage of water content of the noodle strands may be approximately 20 to 35% by mass, preferably approximately 26 to 30% by mass.

It is to be noted that in the present specification, the percentage of water content of the noodle strands refers to a value obtained by measuring the percentage of water content of the whole part of noodle strands in accordance with, for example, an oven-drying method (a method involving heating to 130° C. and measuring the change in weight).

According to one aspect of the method for manufacturing dried noodles of the present invention, first of all, the aforementioned noodle strands are subjected to the drying step. In the drying step, the noodle strands are dried under an environment maintained at a temperature of 30 to 50° C., preferably at 30 to 38° C. At this time, humidity (relative humidity according to JIS Z8806, the same will apply hereinbelow in the present specification) may be 60 to 80%, preferably 72 to 77%. In this drying step, the noodle strands are dried to the percentage water of content of 15% by mass or less, preferably 14% by mass or less.

Subsequently, the resulting noodle strands are transferred to an environment maintained at a temperature of 15 to 25° C., preferably 20 to 25° C., and then subjected to the cooling step under the aforementioned environment.

The temperature change occurring during transfer from the aforementioned drying step to this cooling step, transfer is preferably 1° C./minute.

Humidity in the cooling step may be 40 to 70%, preferably 60 to 70%, and the cooling time may be 15 to 60 minutes, preferably 20 to 40 minutes.

After the cooling step, the resulting noodle strands are subjected to the packaging step. In this step, the noodle strands are appropriately divided in small portions and packaged. No particular limitation is imposed on a packaging container as long as it does not substantially allow penetration of gas and liquid and can withstand the following heating step. Examples of the packaging container include a container manufactured of plastic such as polyethylene (PE), polypropylene (PP), polystyrene (PS), poly (vinyl chloride) (PVC), poly(vinylidene chloride) (PVDC), and polyethylene terephthalate (PET), metal, or a combination of the above substances. The amount of noodle strands per container is 100 g to 3 kg, preferably 300 g to 1 kg.

In the packaging step, the temperature conditions are the same as those applied to the aforementioned cooling step, and no particular limitation is imposed on the humidity conditions. Time required for the packaging step is five minutes or less, preferably three minutes or less.

After the packaging step, the resulting packaged noodle strands are transferred to an environment maintained at a temperature of 30 to 40° C., preferably 30 to 38° C., and then subjected to the heating step under the above environment. The temperature change occurring during transfer from the aforementioned packaging step to this heating step is preferably 1° C./minute. The heating time in the heating step may be 15 to 120 minutes, preferably 20 to 100 minutes. Since the noodle strands are in the packaged state in the heating step, no particular limitation is imposed on the humidity conditions.

Preferably, the noodle strands having been subjected to the aforementioned heating step are subjected to the cooling step once again. The temperature and time conditions applied to the second round of the cooling step are similar to those applied to the aforementioned first round of the cooling step; however, no particular limitation is imposed on the humidity conditions.

The percentage water content of the dried noodles manufactured by the aforementioned method for manufacturing dried noodles of the present invention may be approximately 15 to 10% by mass, preferably approximately 14 to 12% by mass.

In the method for manufacturing dried noodles of the present invention, the aforementioned drying, heating, and cooling steps can each be performed using an instrument which has been conventionally used for drying and cooling of noodle strands, for example an instrument capable of maintaining the temperature and humidity at a constant level such as a constant temperature dryer.

In the method for manufacturing dried noodles of the present invention, other steps can be appropriately performed as needed before the drying step or after the heating step or the second round of the cooling step.

The dried noodles obtained by the manufacturing method of the present invention have no or very little cracking, and thus are free from the risk of damage such as breakage or chipping of noodles, and moreover, have beautiful appearance. Accordingly, the present invention can provide high quality dried noodles with high commercial value.

EXAMPLES

Hereinbelow, the present invention will be described further in detail with reference to Examples. However, the present invention is not limited only to these Examples.

It is to be noted that hereinbelow the conditions of temperature and humidity will indicate average temperature and humidity in each step, and a temperature fluctuation of approximately ±2° C. and a humidity fluctuation of approximately ±1% are acceptable.

Reference Example 1

Manufacture of Udon

To 5 kg of moderate wheat four, 1.65 kg of warm water of 30° C. and 0.2 g of salt were added, followed by kneading, and the resulting dough was left to stand for 10 minutes. The dough thus obtained was rolled out flat by a rolling mill and cut by a noodle slitter, whereby udon noodle strands having a diameter of 1.5 mm and a length of 250 mm were manufactured (percentage of water content, 28% by mass).

Example 1

Four kilograms of the udon noodle strands manufactured in Reference Example 1 were dried under the conditions of 37° C. at a humidity of 77% to obtain udon having the percentage of water content of 14% by mass. Subsequently, the udon thus obtained was cooled for 30 minutes under the conditions of 20° C. at a humidity of 60%, and then placed and sealed in a container (material, polyethylene (PE)), 500 g each. Subsequently, the udon was heated at 30° C. for 30 minutes, whereby dried udon was obtained (percentage of water content, 14% by mass).

Comparative Example 1

Four kilograms of the udon noodle strands manufactured in Reference Example 1 were dried under the conditions of 37° C. at a humidity of 77% to obtain udon having the percentage of water content of 14% by mass. The udon was then cooled under the conditions of 20° C. at a humidity of 60% for 30 minutes, and then placed and sealed in a container (material, polyethylene (PE)), 500 g each, whereby dried udon was obtained (percentage of water content, 14% by mass).

Test Example 1

Cracking of the dried noodles of Example 1 and Comparative Example 1 was visually evaluated and assessment was made based on the following assessment criteria. The results are shown in Table 1.

Assessment Criteria

A: In 1000 noodle strands, white turbidity (cracking) of 1 mm or longer was not confirmed at all (percentage of cracking, 0%).

B: In 1000 noodle strands, white turbidity (cracking) of 1 mm or longer was confirmed at a very small ratio (percentage of cracking, less than 0.5%).
C: In 1000 noodle strands, a large quantity of white turbidity (cracking) of 1 mm or longer was confirmed (percentage of cracking, 0.5% or more).

TABLE 1

| Sample | Example 1 | Comparative Example 1 |
|---|---|---|
| Step | Drying step<br>Temperature 37° C.<br>Humidity 77%<br>(Percentage of water content, 14% by mass)<br>↓<br>Cooling step<br>Temperature 20° C.<br>Humidity 60%<br>Time, 30 minutes<br>↓ | Drying step<br>Temperature 37° C.<br>Humidity 77%<br>(Percentage of water content, 14% by mass)<br>↓<br>Cooling step<br>Temperature 20° C.<br>Humidity 60%<br>Time, 30 minutes<br>↓ |
|  | Heating step<br>Temperature 30° C.<br>Time, 30 minutes | Heating step<br>Without heating step |
| Assessment | A | C |

Test Example 2

Effects of the Temperature Conditions

From the noodle strands manufactured in Reference Example 1, dried udon was manufactured by similar steps to those in Example 1 excluding under the conditions shown in the following Table 2. Cracking of the resulting noodle strands was assessed based on similar assessment criteria to those used in Test Example 1. The results are shown in Table 2.

TABLE 2

|  | Sample | | | | | | | |
|---|---|---|---|---|---|---|---|---|
|  | Sample 1 | Sample 2 | Sample 3 | Sample 4 | Sample 5 | Sample 6 | Sample 7 | Sample 8 |
| Drying step | | | | | | | | |
| Temperature (° C.) | 30 | 37 | 50 | 25 | 30 | 40 | 50 | 55 |
| Humidity (%) | 77 | 77 | 77 | 77 | 77 | 77 | 77 | 77 |
| ↓ Cooling step | | | | | | | | |
| Temperature (° C.) | 20 | 20 | 20 | 20 | 20 | 20 | 20 | 20 |
| Humidity (%) | 60 | 60 | 60 | 60 | 60 | 60 | 60 | 60 |
| Time (minute) | 30 | 30 | 30 | 30 | 30 | 30 | 30 | 30 |
| ↓ Heating step | | | | | | | | |
| Temperature (° C.) | — | — | — | 30 | 30 | 30 | 30 | 30 |
| Time (minute) | — | — | — | 30 | 30 | 30 | 30 | 30 |
| Assessment | C | C | C | C | A | A | A | C |

|  | Sample | | | | |
|---|---|---|---|---|---|
|  | Sample 9 | Sample 10 | Sample 11 | Sample 12 | Sample 13 |
| Drying step | | | | | |
| Temperature (° C.) | 37 | 37 | 37 | 37 | 37 |
| Humidity (%) | 77 | 77 | 77 | 77 | 77 |
| ↓ Cooling step | | | | | |
| Temperature (° C.) | 20 | 20 | 20 | 20 | 20 |
| Humidity (%) | 60 | 60 | 60 | 60 | 60 |
| Time (minute) | 30 | 30 | 30 | 30 | 30 |
| ↓ Heating step | | | | | |
| Temperature (° C.) | 25 | 30 | 35 | 40 | 45 |
| Time (minute) | 30 | 30 | 30 | 30 | 30 |
| Assessment | C | A | A | A | C |

|  | Sample | | | | |
|---|---|---|---|---|---|
|  | Sample 14 | Sample 15 | Sample 16 | Sample 17 | Sample 18 |
| Drying step | | | | | |
| Temperature (° C.) | 37 | 37 | 37 | 37 | 37 |
| Humidity (%) | 77 | 77 | 77 | 77 | 77 |
| ↓ | | | | | |

TABLE 2-continued

| Cooling step | | | | | |
|---|---|---|---|---|---|
| Temperature (° C.) | 10 | 15 | 20 | 25 | 30 |
| Humidity (%) | 60 | 60 | 60 | 60 | 60 |
| Time (minute) | 30 | 30 | 30 | 30 | 30 |
| ↓ | | | | | |
| Heating step | | | | | |
| Temperature (° C.) | 30 | 30 | 30 | 30 | 30 |
| Time (minute) | 30 | 30 | 30 | 30 | 30 |
| Assessment | C | B | A | A | C |

Test Example 3

Effects of the Time Conditions

From the noodle strands manufactured in Reference Example 1, dried udon was manufactured by similar steps to those in Example 1 excluding under the conditions shown in the following Table 3. Cracking of the resulting noodle strands was assessed based on similar assessment criteria to those used in Test Example 1. The results are shown in Table 3.

TABLE 3

| | Sample | | | | | |
|---|---|---|---|---|---|---|
| | Sample 19 | Sample 20 | Sample 21 | Sample 22 | Sample 23 | Sample 24 |
| Drying step | | | | | | |
| Temperature (° C.) | 37 | 37 | 37 | 37 | 37 | 37 |
| Humidity (%) | 77 | 77 | 77 | 77 | 77 | 77 |
| ↓ | | | | | | |
| Cooling step | | | | | | |
| Temperature (° C.) | 20 | 20 | 20 | 20 | 20 | 20 |
| Humidity (%) | 60 | 60 | 60 | 60 | 60 | 60 |
| Time (minute) | 10 | 15 | 20 | 40 | 60 | 65 |
| ↓ | | | | | | |
| Heating step | | | | | | |
| Temperature (° C.) | 30 | 30 | 30 | 30 | 30 | 30 |
| Time (minute) | 30 | 30 | 30 | 30 | 30 | 30 |
| Assessment | C | B | A | A | B | C |

| | Sample | | | | | | | |
|---|---|---|---|---|---|---|---|---|
| | Sample 25 | Sample 26 | Sample 27 | Sample 28 | Sample 29 | Sample 30 | Sample 31 | Sample 32 |
| Drying step | | | | | | | | |
| Temperature (° C.) | 37 | 37 | 37 | 37 | 37 | 37 | 37 | 37 |
| Humidity (%) | 77 | 77 | 77 | 77 | 77 | 77 | 77 | 77 |
| ↓ | | | | | | | | |
| Cooling step | | | | | | | | |
| Temperature (° C.) | 20 | 20 | 20 | 20 | 20 | 20 | 20 | 20 |
| Humidity (%) | 60 | 60 | 60 | 60 | 60 | 60 | 60 | 60 |
| Time (minute) | 30 | 30 | 30 | 30 | 30 | 30 | 30 | 30 |
| ↓ | | | | | | | | |
| Heating step | | | | | | | | |
| Temperature (° C.) | 30 | 30 | 30 | 30 | 30 | 30 | 30 | 30 |
| Time (minute) | 10 | 15 | 20 | 60 | 70 | 100 | 120 | 130 |
| Assessment | C | B | A | A | A | A | B | C |

Reference Example 2

Manufacture of Soba

To 1.5 kg of buckwheat flour and 3.5 kg of moderate wheat flour, 1.425 kg of warm water of 30° C. and 0.075 kg of salt were added, followed by kneading. The resulting dough was rolled out flat by a rolling mill and cut by a noodle slitter, whereby soba noodle strands having a diameter of 1.4 mm and a length of 250 mm were manufactured (percentage of water content, 28% by mass).

Example 2

Four kilograms of the soba noodle strands manufactured in Reference Example 2 were dried under the conditions of 32° C. at a humidity of 77% to obtain soba having the percentage of water content of 14% by mass. Subsequently, the soba thus obtained was cooled for 30 minutes under the conditions of 20° C. at a humidity of 60%, and then placed and sealed in a container (material, polyethylene (PE)), 500 g each. Subsequently, the soba was heated at 30° C. for 30 minutes, whereby dried soba was obtained (percentage of water content, 14% by mass).

Comparative Example 2

Four kilograms of the soba noodle strands manufactured in Reference Example 2 were dried under the conditions of 32° C. at a humidity of 77% to obtain soba having the percentage of water content of 14% by mass. Subsequently, the soba thus obtained was cooled under the conditions of 20° C. at a humidity of 60% for 30 minutes, and then placed and sealed in a container (material, polyethylene (PE)), 500 g each, whereby dried soba was obtained (percentage of water content, 14% by mass).

Test Example 4

Cracking of the dried noodles of Example 2 and Comparative Example 2 was assessed based on similar assessment criteria to those used in Test Example 1. The results are shown in Table 4.

TABLE 4

| Sample | Example 2 | Comparative Example 2 |
| --- | --- | --- |
| Step | Drying step ↓ Cooling step ↓ Heating step | Drying step ↓ Cooling step ↓ (Without heating step) |
| Assessment | A | C |

Reference Example 3

Manufacture of Pasta

To 5 kg of durum wheat, 1.4 kg of warm water of 30° C. was added, followed by mixing. The resulting dough was rolled out flat by a rolling mill and cut by a noodle slitter, whereby cut noodle-type pasta noodle strands having a diameter of 1.6 mm and a length of 250 mm were manufactured (percentage of water content, 28% by mass).

Example 3

Four kilograms of the pasta noodle strands manufactured in Reference Example 3 were dried under the conditions of 37° C. at a humidity of 77% to obtain pasta having the percentage of water content of 12% by mass. Subsequently, the pasta thus obtained was cooled for 30 minutes under the conditions of 20° C. at humidity of 60%, and then placed and sealed in a container (material, polyethylene (PE)), 500 g each. Subsequently, the pasta was heated at 30° C. for 30 minutes, whereby dried pasta was obtained (percentage of water content, 12% by mass).

Comparative Example 3

Four kilograms of the pasta noodle strands manufactured in Reference Example 3 were dried under the conditions of 37° C. at a humidity of 77% to obtain pasta having the percentage of water content of 12% by mass. Subsequently, the pasta thus obtained was cooled under the conditions of 20° C. at a humidity of 60% for 30 minutes, and then placed and sealed in a container (material, polyethylene (PE)), 500 g each, whereby dried pasta was obtained (percentage of water content, 12% by mass).

Test Example 5

Cracking of the dried noodles of Example 3 and Comparative Example 3 was assessed based on similar assessment criteria to those used in Test Example 1. The results are shown in Table 5.

TABLE 5

| Sample | Example 3 | Comparative Example 3 |
| --- | --- | --- |
| Step | Drying step ↓ Cooling step ↓ Heating step | Drying step ↓ Cooling step ↓ (Without heating step) |
| Assessment | A | C |

The invention claimed is:

1. A method for manufacturing dried noodles, the method comprising:
   drying noodle strands to reach a percentage of water content of 12 to 14% under an environment maintained at a temperature of 30 to 50° C. and humidity of 60 to 80%;
   after the drying, cooling the noodle strands for 15 to 60 minutes under an environment maintained at a temperature of 15 to 25° C. and humidity of 40 to 70%;
   after the cooling, packaging the noodle strands; and
   after the packaging, heating the noodle strands for 15 to 120 minutes under an environment maintained at a temperature of 30 to 40° C.

2. The method according to claim 1, further comprising:
   after the heating, cooling the noodle strands for 15 to 60 minutes under an environment maintained at a temperature of 15 to 25° C.

3. The method according to claim 1, wherein a diameter of the noodle strands before the drying is 1 mm to 5 mm.

4. The method according to claim 1, wherein a percentage of water content of the noodle strands before the drying is 20 to 35% by mass.

5. The method according to claim 1, wherein the noodle strands are cut noodles.

6. The method according to claim 2, wherein a diameter of the noodle strands before the drying is 1 mm to 5 mm.

7. The method according to claim 2, wherein a percentage of water content of the noodle strands before the drying is 20 to 35% by mass.

8. The method according to claim 3, wherein a percentage of water content of the noodle strands before the drying is 20 to 35% by mass.

9. The method according to claim 2, wherein the noodle strands are cut noodles.

10. The method according to claim 3, wherein the noodle strands are cut noodles.

11. The method according to claim 4, wherein the noodle strands are cut noodles.

* * * * *